United States Patent
Loughlin (10) Patent No.: US 10,116,128 B1
(45) Date of Patent: Oct. 30, 2018

(54) UNIVERSAL WALL BOX THREAD REPAIR CLIP

(71) Applicant: Patrick Loughlin, Boca Raton, FL (US)

(72) Inventor: Patrick Loughlin, Boca Raton, FL (US)

(*) Notice: Subject to any disclaimer, the term of this patent is extended or adjusted under 35 U.S.C. 154(b) by 0 days.

(21) Appl. No.: 15/947,996

(22) Filed: Apr. 9, 2018

(51) Int. Cl.
*H02G 3/14* (2006.01)
*H02G 3/08* (2006.01)
*H02B 1/40* (2006.01)

(52) U.S. Cl.
CPC ............ *H02G 3/14* (2013.01); *H02G 3/081* (2013.01); *H02B 1/40* (2013.01)

(58) Field of Classification Search
CPC ............ H02G 3/14; H02G 3/081; H02B 1/40
USPC ........................................................ 174/545
See application file for complete search history.

(56) References Cited

U.S. PATENT DOCUMENTS

| 3,663,919 | A | * | 5/1972 | Jaconette | ............. | H01R 13/648 174/51 |
| 4,317,954 | A | | 3/1982 | Giammarra | | |
| 5,823,821 | A | | 10/1998 | Tohanczyn, Jr. | | |
| 8,087,862 | B1 | * | 1/2012 | Smith | ................... | F16B 37/043 174/54 |
| 2007/0209818 | A1 | | 9/2007 | Forrest et al. | | |
| 2008/0207047 | A1 | * | 8/2008 | Walton | ................... | H02G 3/081 439/538 |
| 2008/0217054 | A1 | | 9/2008 | Walton | | |
| 2009/0183346 | A1 | | 7/2009 | Smith | | |

* cited by examiner

*Primary Examiner* — Sherman Ng
(74) *Attorney, Agent, or Firm* — The Concept Law Group, PA; Scott M. Garrett (57) ABSTRACT

A universal wall box thread repair clip includes a front portion that has at least two openings sized to engage the threads of a wall box screw. The repair clip is placed over the end of a wall box so that one of the openings on the front portion is aligned with screw hole formed in the material of the wall box. The repair clip includes retention features that retain it on both plastic and metal wall boxes, where the metal wall boxes include screw tabs that can have varying offset distances.

20 Claims, 5 Drawing Sheets

UNIVERSAL WALL BOX THREAD REPAIR CLIP

FIELD OF THE INVENTION

The present invention relates generally to electrical outlet and switch boxes, and, more particularly, it relates to a universal wall box thread repair clip that can be used to retain the screw or screws if the threads of a wall box become stripped.

BACKGROUND OF THE INVENTION

Electrical wall boxes, sometimes called gang boxes, switch boxes, outlet boxes, etc., house electrical service components, such as outlet plugs and switches, which are accessible through a hole in the wall material. The box is typically affixed to a stud inside the wall, and when the wall material is put up, after wiring the box, a hole is cut in the wall material. To cover the edges of the hole cut into the wall material, a wall plate is attached over the outlet or switch by a screw or screws that thread into a threaded feature of the box. For electrical outlets, the plug assembly is screwed to the box features, and a cover plate is then placed over the plug assembly. There are many designs of wall boxes, and they are constructed out of either metal or plastic. Metal wall boxes are typically formed from a stamped section of sheet metal in which screw tabs are formed that bend over the front opening of the wall box (when formed). The screw tabs have a hole formed in them that is threaded to match the thread of a machine screw, typically having size #6-32 threading. The screw tabs are generally flat, and there is no supporting structure behind them. Plastic wall boxes, on the other hand, are molded, and are formed with a boss or ridge in the center of the interior side of the top and bottom ends of the box. A threaded hole is formed in these ridges to receive a screw.

A common problem with both types of wall boxes is that the threads in the metal screw tabs or plastic ridges becomes stripped, and unable to retain screws. These threads can become stripped rather easily because the tabs of metal wall boxes are relatively thin, and have very few threads in the screw hole, while in plastic wall boxes the type of plastic used to keep costs down tends to be friable. As a result, just over-tightening the screw once can strip the threads.

Several solutions have been developed to address this problem with regard to plastic wall boxes. In general, a clip having teeth that dig into the plastic is placed over an end wall of the box, and the clip has a hole in the metal front of the clip that aligns with the screw hole formed in the ridge. The hole in the clip engages the threads of the screw, while the retaining teeth in the clip hold the clip in place. However, given the variety of designs of plastic wall boxes, clips of different dimensions are needed that correspond with the specific dimensions of the various plastic wall box designs. Furthermore, because these clips are unable to sufficiently retain themselves on metal wall boxes, because the teeth of the clips cannot dig into the metal, they are not a solution for metal wall boxes with stripped wall box screw holes.

Therefore, a need exists to overcome the problems with the prior art as discussed above.

SUMMARY OF THE INVENTION

The invention provides a universal wall box thread repair clip that overcomes the hereinafore-mentioned disadvantages of the heretofore-known devices and methods of this general type and that can be used with both plastic and metal type wall boxes.

With the foregoing and other objects in view, there is provided, in accordance with the invention, a universal wall box thread repair clip that includes a front portion having at least a first opening and a second opening that are each sized to threadably engage a wall box screw. The thread repair clip can further include an outer support portion extending from a first side of the face portion and configured to bear against an outer surface of a wall box. The thread repair clip can further include at least one retention leg extending from a second side of the face portion, the second side being opposite the first side of the face portion and having a tooth formed at a distal end of the at least one retention leg. The first opening of the front portion is configured to align with a screw hole in a wall box of a first type when the at least one retention leg is engaged with features of the wall box of the first type. The second opening of the front portion is configured to align with a screw hole in a wall box of a second type when the at least one retention leg is engaged with features of the wall box of the second type. The features of the wall box of the first type are different than the features of the wall box of the second type.

In accordance with another feature, an embodiment of the present invention includes the first and second openings can be slots having a width equal to a shaft diameter of the wall box screw.

In accordance with a further feature of the present invention, the wall box of the first type is a plastic wall box, and wherein the tooth of the at least one retention leg engages plastic wall box to retain the universal wall box thread repair clip on the plastic wall box In accordance with a further feature of the present invention, the wall box of the second type is a metal wall box, wherein the at least one retention leg defines a slot at an inner edge of the at least one retention leg and at the front portion; and the slot has a length and width sized such that when the universal wall box thread repair clip mounted on the metal wall box over a screw tab of the metal wall box, and slid relative to the screw tab such that an edge of the screw tab is captured in the slot, the second opening the front portion is aligned with a screw hole in the screw tab.

In accordance with a further feature of the present invention, the thread repair clip can further include further a third opening on the front portion.

In accordance with a further feature of the present invention the at least one retention leg can be two retention legs which each extend from the second side of the front portion, each of the two retention legs can have a respective inside edge, and wherein the inside edges of the two retention legs define a channel between the two retention legs that is wide enough to accommodate a ridge of a plastic wall box and a screw tab of a metal wall box.

In accordance with a further feature of the present invention the first opening is centered with respect to the channel defined between the two retention legs.

In accordance with a further feature of the present invention each retention leg of the at least one retention leg can include a tool hole configured to receive a tool that can disengage the respective retention leg to remove the universal wall box thread repair clip.

In accordance with another embodiment, the present invention can include thread repair clip for use with several different types of wall boxes, including at least a plastic wall box and a metal wall box, the plastic wall box having a ridge including a screw hole, and the metal wall box include a screw tab having a screw hole. The thread repair clip can include a front portion having a first opening and a second opening through the front portion. The first and second openings can be sized to engage threads of a wall box screw. The thread repair clip can further include an outside support portion extending from a top of the front portion which is configured to bear against an outside surface of a wall box on which the thread repair clip is mounted. The thread repair clip can further include at least one retention leg extending from a bottom of the front portion in the same direction as the outer support portion and including a first retention feature for retaining the thread repair clip on a plastic wall box wherein the first opening is aligned with a screw hole of the plastic wall box. The at least one retention leg can further include a second retaining feature for retaining the thread repair clip on a metal wall box wherein the second opening of the front portion is aligned with a screw hole of the metal wall box when the second retaining feature is retaining the thread repair clip on the metal wall box.

In accordance with yet another feature, an embodiment of the present invention includes the first retaining feature being a portion of the at least one retention leg configured as at least one tooth oriented to engage the plastic wall box.

In accordance with another embodiment, the present invention can include a thread repair clip that includes a front portion having a first opening, a second opening on a first side of the first opening, and a third opening on a second side, opposite the first side of the first opening. Each of the first, second, and third openings have a width that is sized to engage the threads of a wall box screw. The thread repair clip can further include an outside support portion that extends from the front portion at a top of the front portion and at substantially a 90 degree angle from a face of the front portion. The thread repair clip can further include a first retention leg extending from a bottom of the front portion in a same direction as the outside support portion and defining a first slot at an inside edge of the first retention leg along the bottom of the front portion. The thread repair clip can further include a second retention leg extending from a bottom of the front portion in a same direction as the outside support portion and defining a second slot at an inside edge of the second retention leg along the bottom of the front portion. The inside edge of the first retention leg and the inside edge of the second retention leg define a channel between the first and second retention legs; wherein the first opening of the front portion is configured to align with a screw hole in a ridge of a plastic wall box when the thread repair clip is mounted on the plastic wall box. The second opening of the front portion is configured to align with a screw hole in a screw tab of a first metal wall box when the thread repair clip is mounted on the first metal wall box such that a portion of the screw tab of the first metal wall box is disposed in the first slot. The third opening of the front portion is configured to align with a screw hole in a screw tab of a second metal wall box when the thread repair clip is mounted on the second metal wall box such that a portion of the screw tab of the second metal wall box is disposed in the second slot.

Although the invention is illustrated and described herein as embodied in a universal wall box thread repair clip, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the item being described. Those skilled in the art can understand the specific meanings of the above-mentioned terms in the embodiments of the present invention according to the specific circumstances

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient thread repair clip that can be used on a wide variety of wall boxes, including wall boxes constructed of both plastic and metal materials, and, in metal wall boxes, having different screw tab offset distances. The disclosed embodiments solve the problem of the prior art repair clips by being usable with both plastic and metal wall boxes, which was not possible before with metal wall boxes since clips designed to retain themselves on plastic wall boxes cannot grab or dig into the material of metal wall boxes sufficiently to be retained.

Figure 1:
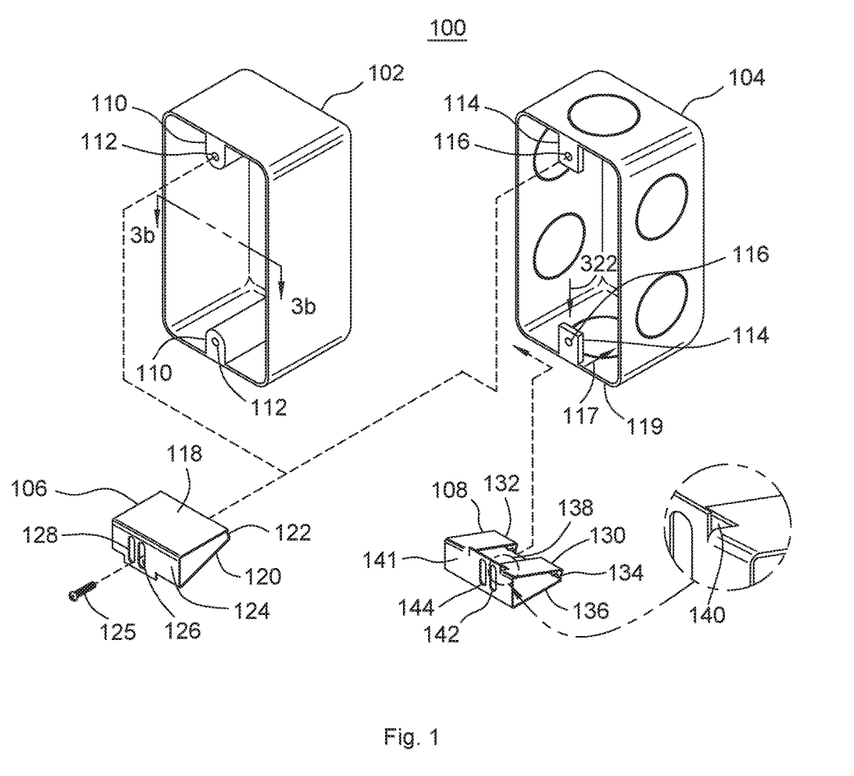
FIG. 1 is a perspective view of a wall box system and universal wall box thread repair clip, in accordance with some embodiments.

Referring now to FIG. 1, one embodiment of the present invention is shown in a perspective view. FIG. 1 shows several advantageous features of the present invention, but, as will be described below, the invention can be provided in several shapes, sizes, combinations of features and components, and varying numbers and functions of the components. The first example is of a universal wall box thread repair clip, in accordance with some embodiments.

Two different wall boxes 102, 104 are shown, with wall box 102 being an example of a plastic molded wall box, and wall box 104 being an example of a metal wall box. The two wall boxes 102, 104 show general features of the two types of wall boxes, but those skilled in the art will appreciate that there are many different specific designs of each type of wall box. The plastic wall box 102 includes, on an interior surface of each end, and centrally located, a ridge 110 in which a screw hole 112 is provided. The ridge 110 generally runs from the front of the wall box 102, which is open to allow access to the interior of the wall box 102, to the back of the wall box 102. The screw holes 112 can be threaded after the wall box 102 is formed. The metal wall box 104 can be formed of sheet metal that is folded and welded, or drawn, into the general shape of the wall box 104, and is formed having a pair of screw tabs 114 that extend from the ends, at the front, and centrally located, on the wall box 104, which are bent down over the front opening of the wall box 104. Each screw tab 114 is further formed with a screw hole 116 that can be threaded, like the screw holes 112 of the plastic wall box 102, to receive a standard wall box screw 125. Wall box screws are generally size #6-32 and can have varying lengths depending on the dimensions of the wall box to which they are being coupled and can be used, for example, to mount electrical plug or switch assemblies in the wall box, and/or retain cover plates over the wall box, and so on.

Two repair clips 106 and 108 are shown, which, for the purposes of example, can be assumed to be dimensionally identical, and are generally formed of a sheet metal having a substantial spring temper or equivalent spring properties. Repair clip 106 is oriented to be placed over the upper end of wall box 102, and the top perspective of the clip is shown. Repair clip 108 is shown in a bottom perspective view orientation, and is intended, in this example, to be used on the lower side of metal wall box 104. An outer support portion 118 extends from a front portion 124, and is configured to bear against an outer surface of a wall box 102 (and 104). In some embodiments, the outer support portion 118 may have ridges or other force-concentrating features to engage the plastic material of the wall box 102 for retention of the repair clip 106. On the front portion 124 of the clip 106 there are at least two openings 126, 128, generally in the central region of the front portion 124. The openings 126, 128 have a width or diameter slightly larger than the shank of a wall box screw, but smaller than the outside diameter of the threads on the shank of the wall box screw, which allows the threads of the wall box screw to threadably engage the edges of the opening 126 or 128, thereby retaining the wall box screw in the opening 126 or 128. Repair clip 108 is oriented to show the underside arrangement of the clips 106, 108, and shows two retention legs 130, 132 the extend from the front portion at a second side of the front portion, opposite the first side, from which the outer support portion extends. Two retention legs 130, 132 are shown here, but in some embodiments only one retention leg may be provided. Between the retention legs 130, 132 is a space or channel 138 that is wide enough to accommodate the ridge 110 of the plastic wall box 102, and the screw tab 114 of the metal wall box 104. The inside edges of the retention legs 132, 130, which define the channel 138, can be spaced apart so as to center the clip over the ridge 110, such that opening 126 aligns with screw hole 112. At the end of the retention legs on clip 106, such as retention leg 120, and on retention legs 130, 132, are engaging features 122, 134 that are sharp, force-concentrating features that can engage the material of the plastic wall box 102 to retain the repair clip 106 on wall box 102.

Repair clip 108 likewise has engaging features such has teeth 134 on the ends of both retention legs 130, 132, but these are ineffective when used on the metal wall box 104. However, the clips 106, 108 are provided with engaging features for use on metal wall boxes, in the form of a transverse slot 140 formed in one or both of the retention legs 130, 132. Slot 140 is formed at the inner edge of the retention leg 130 where the retention leg joins the front portion 141, and extends toward the outside of the retention leg 130 for a short distance. The width of the slot 140 is sized to receive the edge of a screw tab, such as screw tab 114.

When the repair clip 108, oriented as shown, is placed over the lower end of the metal wall box 104, the outer support portion 136 slides over the exterior of the bottom end of the metal wall box 104, the retention legs 130, 132 slide over the interior of the end of the wall box 104, and the tab 114 passes between the retention legs 130, 132 until the back of the front portion 141 bears against the front of the metal wall box 104. At this point, opening 144 is aligned with screw hole 116 in screw tab 114, but the retaining features of the repair clip, such as teeth 134 cannot sufficiently engage the metal material of the metal wall box 104 to retain the repair clip 108 on the metal wall box 104. But, by sliding the repair clip to the left, in the present example, the right edge of the screw tab 114 engages the slot 140, and opening 142 becomes aligned with screw hole 116. At this point, a portion of the retention leg 130 defining the slot 140 will be behind the screw tab 114. Once a wall box screw is threaded through opening 142 and into screw hole 116, the repair clip 108 will be unable to slide back to the right, and will be thereby retained on the metal wall box 104.

In metal wall box designs, the distance 117 of the screw tab 114 from the front 119 of the box can vary. In some designs the screw tab 114 can be flush or almost flush with the front (i.e. as when looking down in the direction of arrow 322), and in some designs the screw tab can be recessed back from the front 119, such that distance 117 is larger. Thus, slot 140 in the repair clips 106, 108 must be the right size to accommodate the offset distance 117 to that the screw tab 114 can be accommodated inside the slot 140. In some embodiments the repair clips 106, 108 can have a slot like slot 140 on each retention leg 130, 132 of different widths to accommodate screw tabs with different offset distances 117.

In addition to the difference in material used in the construction of wall boxes (i.e. metal or plastic), wall boxes can vary in dimensions as well. One dimension that can vary is the distance between the ends of the box. The distance between screw holes (e.g. 112 or 116) can be standardized, but the distance from the screw holes to the outside surface of the wall boxes can vary among wall box designs. To accommodate these different designs, the openings 126, 128 (which are the same as 142, 144) can be configured as slots having a width sized to engage the threads of wall box screws. The slots are arranged to run from the first side of the repair clip 106 where the outer support portion 118 meets the front portion 124, to the second side of the front portion 124 where the retentions legs meet the front portion 124. The slots accommodate variations in distance between the screw holes 112, 116 and the exterior of the wall box, against which the outer support portion 118, 136 will bear when the repair clip 106, 108 is mounted on the wall box 102, 104. Accordingly, the thread repair clips as exemplified in repair clips 106, 108, are "universal" in the sense that they can be used with wall boxes constructed of different materials, and having differing dimensions, unlike prior art repair clips that only fit one type of wall box and are limited to use with plastic wall boxes.

Figure 2A:
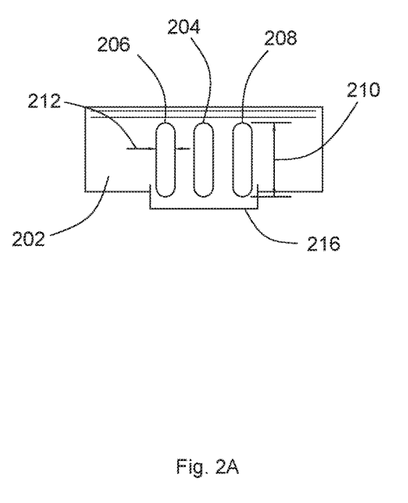
FIG. 2A is a front view of a universal wall box thread repair clip, in accordance with some embodiments.
Figure 2B:
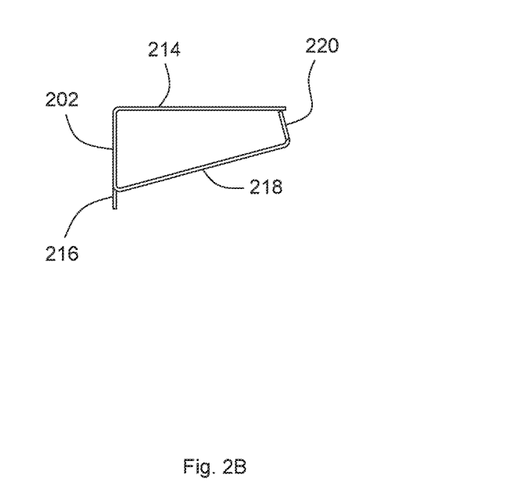
FIG. 2B is a side view of a universal wall box thread repair clip, in accordance with some embodiments.
Figure 3:
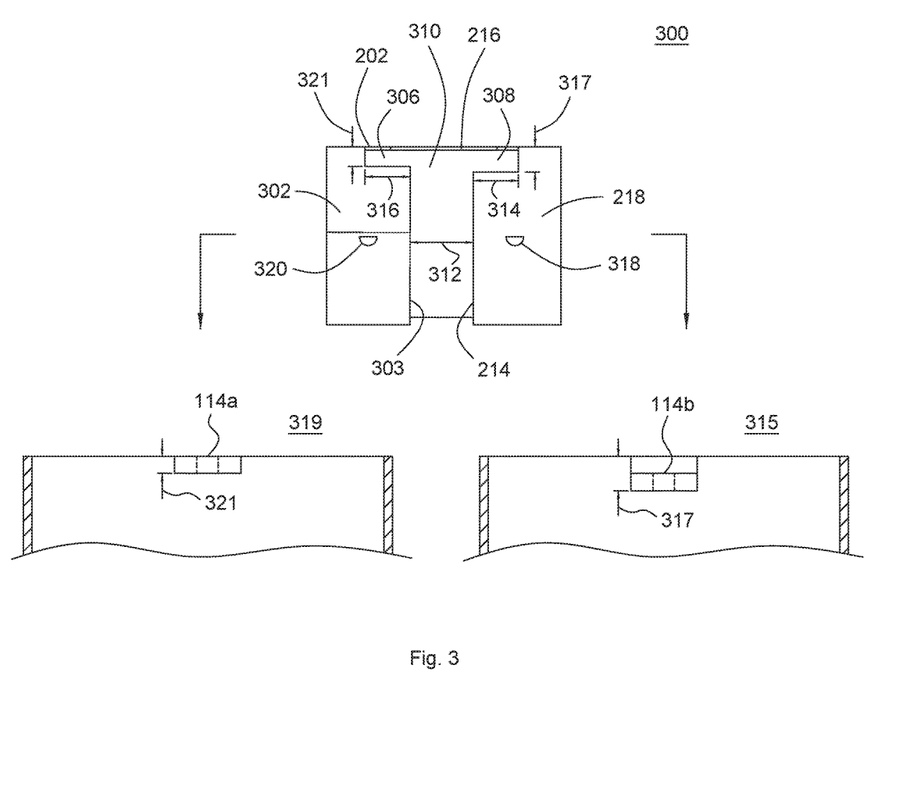
FIG. 3 is bottom view of a universal wall box thread repair clip, in accordance with some embodiments.

FIG. 2A is a front view of a universal wall box thread repair clip 200, in accordance with some embodiments. FIG. 2B is a side view of the repair clip 200, and FIG. 3 is a bottom view of the repair clip 200. On the front portion 202 there are three slotted openings 204, 206, 208 having a slot height 210 and a slot width 212. The slots 204, 206, 208 are each located on the front portion to correspond with the screw holes of a different respective wall box type when the repair clip 200 is properly placed on a given wall box. The slots all have a width 212 such that the sides of the slots 204, 206, 208 engage the threads of a wall box screw when the wall box screw is screwed into any of the slots 204, 206, 208. The slot height 210 allows for variations in external dimensions of wall boxes, and specifically for variations in distance between the screw holes and the outside surfaces of the ends of the wall box. The slots 204, 206, 208 can extend into a tab portion 216 that extends the front portion 202 down below the line where the legs 218 meet the front portion 202 on either side of the tab portion 216. The tab portion 216 allows the slots 204, 206, 208 to be taller in order to accommodate a wider range of box dimensions since the distance between the screw hole and the top/bottom surface of various box designs can differ.

In the side view of FIG. 2B it can be seen that an outside support portion 214 extends from one side (e.g. a top side) of the front portion 202. The outside support portion 214 is configured to bear against the outside or exterior surface of an end (e.g. a side) of a wall box, once the repair clip 200 is put in place on a wall box. One or more retention legs such as retention leg 218 extend from a second side (e.g. a bottom side) of the front portion 202 in the same direction as the outside support portion 214. The retention leg 218 has a distal end on which a retaining feature such as a tooth or teeth 220 are formed. The teeth 220 are formed by the distal end of the retaining leg 218 being bent upwards, toward the outside support portion 214, and can be angled slightly forward, towards the front portion 202. The teeth 220 are cut so that at their terminus, they have points and sharp edges that can dig into, and engage the material of plastic wall boxes so as to retain the repair clip 200 on the plastic wall box. Further, by angling the teeth 220 forward, towards the front portion 202, it makes it easier to slide the repair clip over the side of a wall box since the force of the side of the wall box will deflect the teeth 220 and the retention leg 218 downwards, away from the outside support portion 214. The material of the repair clip 200 is such that the retention leg 218 does not yield, and resists deflection away from the outside support portion 214. Thus, the outside support portion 214 and the retention leg 218 act as a spring, creating a force between the retention leg 218 and the outside support portion 214 that causes the teeth 220 to engage the plastic material of a plastic wall box.

In FIG. 3 the spring clip 200 is shown with two retention legs 218, 302. The retention legs 218, 302 each have in inside edge 219, 303, respectively, separated from each other by a distance 312 that is sized to accommodate the ridges (e.g. ridge 110) formed in plastic wall boxes, and the screw tabs (e.g. 114) of metal wall boxes. The resulting channel 310 between the retention legs can act as a guide to align one of the openings such as opening 204 with the screw hole (e.g. screw hole 112) formed in the ridge of a plastic wall box.

To be retained on metal wall boxes, a first slot 306 can be formed in retention leg 302, which extends from the inside edge of the retention leg 302 a length 316 along the bottom of the front portion 202, and having a width or depth 321. The first slot 306 is wide enough (in a direction perpendicular to width 316) to accommodate a screw tab (e.g. screw tab 114 of FIG. 1) of a metal wall box in a close fitting manner, with a first offset distance 321, as indicated in inset 319. Similarly, a second slot 308 is formed in retention leg 218 having a length 314 that is the same as length 316, but having a second width 317 that is larger than width 321 to accommodate screw tabs with a larger offset distance, as in inset 315. Inset 315 and inset 319 show views when looking in the direction of arrow 322 in FIG. 1 at the screw tabs 114a, 114b, respectively, and end of the wall box. The first and second slots 306, 308 are used for engaging screw tabs of different offset distances 317, 321 in different metal wall box designs. Thus, for a metal wall box having screw tabs of a first offset distance 321, the repair clip 200 can be slid to the right with respect to the views of FIGS. 2A and 3, resulting in the left side of the screw tab being captured in slot 306, and opening 212 then being aligned with the screw hole (e.g. screw hole 116 of FIG. 1) of the screw tab. Likewise, slot 308 is used for screw tabs having a second offset distance 317, and the repair clip 200 can be slid to the left once placed over the end of the wall box to capture the right edge of a screw tab in slot 308 and align opening 208 with the screw hole in that screw tab.

When the repair clip 200 is pushed over the side wall of a wall box, it will be generally centered with respect to either a ridge or screw tab, depending on the type of wall box. For plastic wall boxes the user need only align the center opening 204 with the screw hole in the ridge, as the engagement features such as teeth 220 will act to retain the repair clip on the plastic wall box. For metal wall boxes the user can slide the repair clip 200 left or right to capture a side or edge of a screw tab in a slot 306, 308, aligning the corresponding opening 206, 208 with the screw hole in the screw tab. When used on plastic wall boxes the teeth 220 and spring action between the outside support portion 214 and retention leg(s) 218, 302 is sufficient to retain the repair clip in place by engaging (digging into) the material of the plastic wall box. For metal wall boxes the repair clip is retained by capturing the edge of the screw tab in one of the slots 306, 308, and by inserting a wall box screw into either opening 206 or opening 208 and further into the screw hole of the screw tab. The retention legs 218, 302 can be provided with removal tool holes 318, 320 the allow a tool to engage the retention legs and deflect them away from the outside support portion 214 to allow removal of the repair clip 200 from a plastic wall box.

Figure 4:
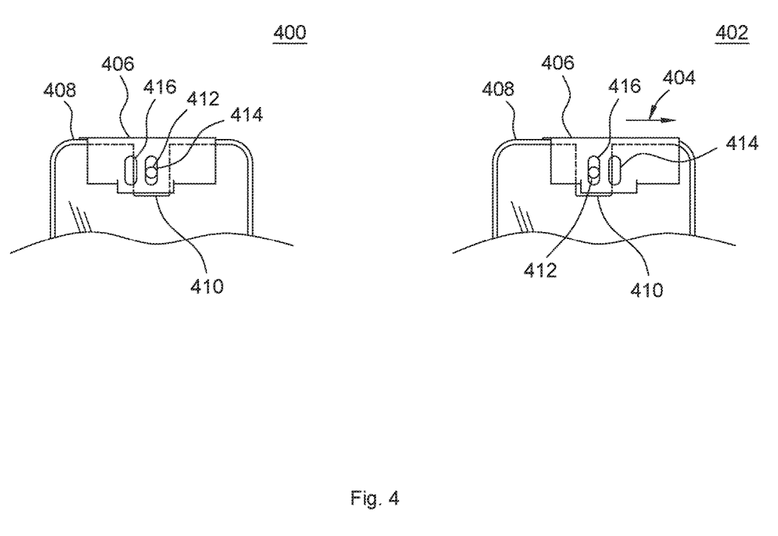
FIG. 4 is an assembly stage diagram from the front view of a wall box on which a universal wall box thread repair clip is assembled, in accordance with some embodiments.

FIG. 4 is an assembly stage diagram from the front view of a wall box on which a universal wall box thread repair clip 406 is assembled, in accordance with some embodiments. View 400 is an initial view when the repair clip 406 is pushed on the edge of a metal wall box 408, and view 402 shows the repair clip slid to the right, as indicated by arrow 404, after being pushed completely onto the metal wall box 408. Initially, as seen in view 400, the repair clip 406 is roughly centered with respect to screw tab 410, and opening 414 is aligned with screw hole 412. However, in this position as shown in view 400, the repair clip 406 is insufficiently retained on the metal wall box 408; even threading a wall box screw through opening 414, assuming screw hole 412 is stripped, will allow the repair clip to be pulled off the metal wall box (i.e. out of the page). By sliding the repair clip 406 to the right, as indicated by arrow 404, the screw tab 410 then becomes captured in a slot (e.g. slots 306, 308) formed in a retention leg on the bottom of the repair clip 406, and the screw hole 412 is then aligned with opening 416. In the position as shown in view 402, the repair clip 406 cannot move forward (i.e. out of the page), and once a wall box screw is threaded through opening 416 and into screw hole 412 the repair clip will not be able to move left or right, either. Although shown here with two openings 414, 416, there can be a third opening as shown in FIG. 2A to accommodate screw tabs of different widths. When three openings (e.g. 204, 206, 208) are used, then the repair clip will also include two slots such as slots 306, 308 having different offset distances 321, 317, respectively, in the retention legs, or equivalent structure.

Figure 5:
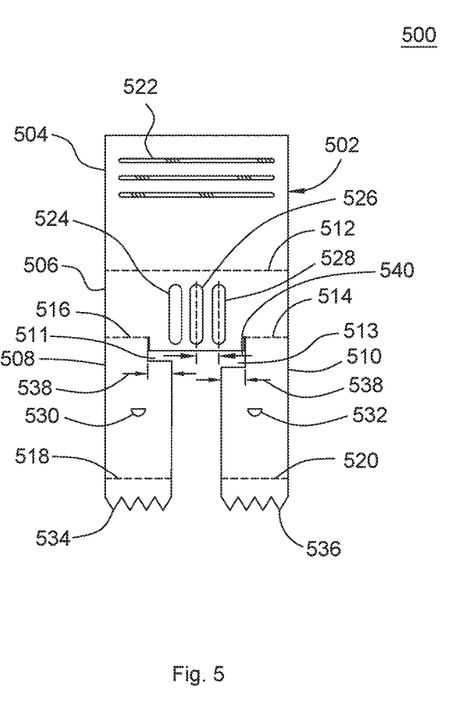
FIG. 5 is a plan view of a sheet metal stamping prior to bending to form a universal wall box thread repair clip, in accordance with some embodiments.

FIG. 5 is a plan view 500 of a sheet metal stamping 502 prior to bending to form a universal wall box thread repair clip, in accordance with some embodiments. The stamping 502 can be a die cut portion of metal, such as, for example, steel, having a thickness of 0.010 to 0.030 inches. A first portion 504 is used to form the outside support portion by bending the stamping 502 at bend line 512. Retainer legs can be formed by bending portions 508, 510 in the same direction as portion 504, along bend lines 514, 516. A slot 511 can be formed as a cutout when the stamping 502 is cut. Furthermore, openings 524, 526, 528 can be cut as well, to align with screw holes in various types of wall boxes. Once portions 504, 508, and 510 are bent, portion 506 forms a front portion of the repair clip. Retaining features such as teeth can also be formed by bending portions 534, 536 substantially as shown in FIG. 2B (e.g. teeth 220). Tool holes 530, 532 can also be cut to allow removed of the repair clip from plastic wall boxes. Once bent into the shape of the repair clip, the stamping 502 can be heat treated to give the metal a spring temper. In some embodiments ridges 522 or teeth, can be formed in portion 504 as force focusing features for additional retention. It will be appreciated that in some embodiments only one retention leg is needed, and either portion 508 or portion 510 can be left out, or substantially reduced. Further, the slots for engaging the sides of screw tabs, such as slot 511, do not need to be formed in a retention leg portion, they just need sufficient material (sheet metal) to prevent the repair clip from moving forward once the repair clip is slid to the side and the screw tab is engaged in the slot. It will further be appreciated that the width 538 of slots 511, 513 must be at least as much as the inter-opening distance 540 between the openings 524, 526, 528 to accommodate sliding the clip sufficiently to align either opening 524 or opening 528 with the screw hole in a screw tab of a metal box.

A universal wall box thread repair clip has been disclosed that allows wall boxes with stripped threads to be used, avoiding the necessity of having to replace the wall box. Unlike prior art thread repair clips, the inventive embodiments of the disclosed universal wall box thread repair clip can be used with both plastic and metal wall boxes, as well as with wall boxes of different dimensions. The inventive thread repair clip include multiple openings on a front portion, where one opening is used for plastic wall boxes, and another opening is used for metal wall boxes because the thread repair clip is moved laterally on the front the metal wall box to move a portion of the thread repair clip behind the screw tab of the metal wall box, preventing the thread repair clip from moving away from the wall box (i.e. in the forward direction).

What is claimed is:

1. A universal wall box thread repair clip, comprising:
   a front portion having at least a first opening and a second opening that are each sized to threadably engage a wall box screw;
   an outer support portion extending from a first side of the front portion and configured to bear against an outer surface of a wall box;
   at least one retention leg extending from a second side of the front portion, the second side being opposite the first side of the front portion and having a tooth formed at a distal end of the at least one retention leg; and
   wherein the first opening of the front portion is configured to align with a screw hole in a wall box of a first type when the at least one retention leg is engaged with features of the wall box of the first type, and wherein the second opening of the front portion is configured to align with a screw hole in a wall box of a second type when the at least one retention leg is engaged with features of the wall box of the second type, and wherein the features of the wall box of the first type are different than the features of the wall box of the second type.

2. The universal wall box thread repair clip of claim 1, wherein the first opening and second opening are slots having a width equal to a shaft diameter of the wall box screw.

3. The universal wall box thread repair clip of claim 1, wherein the wall box of the first type is a plastic wall box, and wherein the tooth of the at least one retention leg engages plastic wall box to retain the universal wall box thread repair clip on the plastic wall box.

4. The universal wall box thread repair clip of claim 1, wherein:
- the wall box of the second type is a metal wall box, wherein the at least one retention leg defines a slot at an inner edge of the at least one retention leg and at the front portion; and
- the slot having a length and width sized such that when the universal wall box thread repair clip mounted on the metal wall box over a screw tab of the metal wall box, and slid relative to the screw tab such that an edge of the screw tab is captured in the slot, the second opening the front portion is aligned with a screw hole in the screw tab.

5. The universal wall box thread repair clip of claim 1, further comprising a third opening on the front portion having a width equal to that of the first opening and second opening.

6. The universal wall box thread repair clip of claim 1, wherein the at least one retention leg is two retention legs which extend from the second side of the front portion, each of the two retention legs having a respective inside edge, and wherein the inside edges of the two retention legs define a channel between the two retention legs that is wide enough to accommodate a ridge of a plastic wall box and a screw tab of a metal wall box.

7. The universal wall box thread repair clip of claim 6, wherein the first opening is centered with respect to the channel defined between the two retention legs.

8. The universal wall box thread repair clip of claim 1, wherein each retention leg of the at least one retention leg includes a tool hole configured to receive a tool that can disengage the respective retention leg to remove the universal wall box thread repair clip.

9. A thread repair clip for use with several different types of wall boxes, including at least a plastic wall box and a metal wall box, the plastic wall box having a ridge including a screw hole, and the metal wall box include a screw tab having a screw hole, the thread repair clip comprising:
- a front portion having a first opening and a second opening through the front portion, the first opening and second opening being sized to engage threads of a wall box screw;
- an outer support portion extending from a top of the front portion which is configured to bear against an outside surface of a wall box on which the thread repair clip is mounted; and
- at least one retention leg extending from a bottom of the front portion in a same direction as the outer support portion and including a first retaining feature for retaining the thread repair clip on a plastic wall box wherein the first opening is aligned with a screw hole of the plastic wall box, the at least one retention leg further including a second retaining feature for retaining the thread repair clip on a metal wall box wherein the second opening of the front portion is aligned with a screw hole of the metal wall box when the second retaining feature is retaining the thread repair clip on the metal wall box.

10. The thread repair clip of claim 9, wherein the first opening and second opening are configured as slots.

11. The thread repair clip of claim 9, wherein the first retaining feature is a portion of the at least one retention leg configured as at least one tooth oriented to engage the plastic wall box.

12. The thread repair clip of claim 9, wherein the second retaining feature comprises a transverse slot defined in the at least one retention leg at an inside edge along the bottom of the front portion, and which is configured to receive an edge of the screw tab of the metal wall box.

13. The thread repair clip of claim 9, wherein the at least one retention leg is two retention legs, and wherein the second retaining feature is disposed on only one of the two retention legs.

14. The thread repair clip of claim 9, further comprising:
- a third opening on the front portion having a width equal to that of the first opening and second opening on the front portion; and
- wherein the at least one retention leg comprises two retention legs; the second retaining feature being disposed on a first one of the two retention legs and a third retaining feature being disposed on a second one of the two retention legs.

15. The thread repair clip of claim 9, further comprising a tool hole formed in the at least one retention leg that is configured to allow a tool to disengage the first retaining feature.

16. The thread repair clip of claim 9, wherein the at least one retention leg is two retention legs including a first retention leg and a second retention leg which define a channel between the first and second retention legs having a width sized to accommodate both of the ridge of the plastic wall box and the screw tab of the metal wall box, the first opening in the front portion is centered with respect to the channel defined between the first and second retention legs.

17. A thread repair clip, comprising:
- a front portion having a first opening, a second opening on a first side of the first opening, and a third opening on a second side, opposite the first side of the first opening, wherein each of the first opening, second opening, and third opening have a width that is sized to engage threads of a wall box screw;
- an outside support portion that extends from the front portion at a top of the front portion and at substantially a 90 degree angle from a face of the front portion;
- a first retention leg extending from a bottom of the front portion in a same direction as the outside support portion and defining a first slot at an inside edge of the first retention leg along the bottom of the front portion;
- a second retention leg extending from a bottom of the front portion in a same direction as the outside support portion and defining a second slot at an inside edge of the second retention leg along the bottom of the front portion;
- wherein the inside edge of the first retention leg and the inside edge of the second retention leg define a channel between the first and second retention legs;

wherein the first opening of the front portion is configured to align with a screw hole in a ridge of a plastic wall box when the thread repair clip is mounted on the plastic wall box;

wherein the second opening of the front portion is configured to align with a screw hole in a screw tab of a first metal wall box when the thread repair clip is mounted on the first metal wall box such that a portion of the screw tab of the first metal wall box is disposed in the first slot; and wherein the third opening of the front portion is configured to align with a screw hole in a screw tab of a second metal wall box when the thread repair clip is mounted on the second metal wall box such that a portion of the screw tab of the second metal wall box is disposed in the second slot.

18. The thread repair clip of claim 17, wherein at least one of the first and second retention legs includes one or more teeth configured to engage the material of the plastic wall box.

19. The thread repair clip of claim 17, wherein the thread repair clip is comprised of a metal having a spring temper.

20. The thread repair clip of claim 17, wherein each of the first and second retention legs include a respective tool hole.

\* \* \* \* \*